United States Patent [19]

Matsuda et al.

[11] 4,008,339
[45] Feb. 15, 1977

[54] PROCESS FOR REMOVING POLYPHENOLS IN VEGETABLE BEVERAGES

[75] Inventors: Shogo Matsuda; Tomio Kuriki; Kazuto Ohue; Kunihiko Okajima, all of Osaka, Japan

[73] Assignee: Asahi Kasei Kogyo Kabushiki Kaisha, Osaka, Japan

[22] Filed: Dec. 24, 1975

[21] Appl. No.: 644,339

[30] Foreign Application Priority Data

Dec. 28, 1974  Japan .............................. 50-149174

[52] U.S. Cl. .......................... 426/330.4; 426/330.5; 426/422; 260/78 SC
[51] Int. Cl.² ......................................... C12H 1/04
[58] Field of Search .......... 426/271, 422, 423, 323, 426/329, 330.3, 330.4; 260/78 SC

[56] References Cited
UNITED STATES PATENTS

| | | | |
|---|---|---|---|
| 2,430,875 | 11/1947 | Hallowell et al. ........... | 260/78 SC X |
| 2,860,987 | 11/1958 | Werner ................. | 426/422 |
| 3,878,310 | 4/1975 | Field ................... | 426/422 |

Primary Examiner—Steven L. Weinstein
Attorney, Agent, or Firm—Armstrong, Nikaido & Wegner

[57] ABSTRACT

Vegetable beverages are clarified or stabilized by using an adsorbent material consisting essentially of a specified N-substituted polyamide or polyamide mixture. The specified polyamide is such that 0.5% to 65% in number of the hydrogen atoms linked to the nitrogen atoms of the amide linkages in the main chain are substituted with substituents represented by the formula $-(CH_2)_n-R$ where $n$ is an integer of 1 to 4 and R is at least one member selected from a hydrogen atom, a hydroxyl group and an alkoxy group having 1 to 4 carbon atoms and Rs in the molecule are the same as or different from each other.

7 Claims, 3 Drawing Figures

PROCESS FOR REMOVING POLYPHENOLS IN VEGETABLE BEVERAGES

FIELD OF THE INVENTION

This invention relates to an adsorbent material used for removal of polyphenols from vegetable beverages such as beers, wines and fruit juices. It relates further to a process for clarifying and stabilizing such vegetable beverages against precipitation caused by the presence therein of polyphenols.

DESCRIPTION OF THE PRIOR ARTS

Vegetable beverages of the aforesaid type are subject to the formation of haze or turbidity when stored for long periods or at a low temperature, e.g. approximately 0° C. Such haze or turbidity forming, for example, in beers may be divided into two types. One type is popularly called "chill-haze", which forms when the vegetable beverage is cooled to approximately 0° C and is eliminated when the vegetable beverage is heated. The other type is popularly called "permanent haze" which also forms when the vegetable beverage is cooled to approximately 0° C but is not eliminated when heated. It is said that these hazes are formed by the association of polyphenols with protein both present in the vegetable beverages. Therefore, if either one or both the polyphenols and protein are removed from the vegetable beverage in the course of their production, these hazes can be eliminated.

White wine becomes brown when stored for long periods. It is said that such coloration is caused by conversion of polyphenols into coloring matter due to enzymes. Such coloration is also eliminated by removal of either one or both polyphenols and enzymes.

Many proposals have been heretofore made in order to prevent or mitigate the undesirable formation of hazes and coloration in vegetable beverages.

One proposal involves the use of adsorbent for removal of polyphenols. Adsorbents proposed for use are: polyvinyl pyrrolidone in U.S. Pat. No. 2,698,550; water-insoluble polymers of vinylpyrrolidone, i.e. polyvinyl polypyrrolidone, in U.S. Pat. No. 2,947,633; clays such as montmorillonite and bentonite, having silica gel incorporated therein in German Patent No. 682,788; finely divided silica gel particles in Austrian Patent No. 249,611, and; finely divided polyamide powders having silica gel incorporated therein in British Patent No. 1,333,293. Although these adsorbents are effective for mitigation of hazes, they are not satisfactory for prevention of hazes, particularly permanent haze.

Another proposal involves the use of enzymes capable of decomposing protein. This proposal is made, for example, in U.S. Pat. No. 955,820, No. 995,823, No. 995,826, No. 3,055,757, No. 3,597,219 and No. 3,597,220. However, such enzymatic treatment of beverages is not advantageous for the following reasons. The decomposition and removal of protein mean reduction in the nutritive value and have a deleterious effect on the flavor of beverages. They also have a deleterious effect on the foam stability of beer. Further, the enzyme remaining in beverages might adversely affect the quality of beverages, for example, a decomposition product of the enzyme tends to be associated with polyphenols and forms haze or turbidity when the beverages are stored for long periods.

GENERAL DESCRIPTION OF THE INVENTION

It now has been found that specified N-substituted polyamides in the form of finely divided powders or flakes are good adsorbents for the selective removal of polyphenols present in beverages such as beer, wine and fruit juices. Such polyamides are those in which 0.5% to 65% in number of the hydrogen atoms linked to the nitrogen atoms of the amide linkages in the main chain are substituted with substituents represented by the formula

where R is a hydrogen atom, a hydroxyl group and/or an alkoxy group having 1 to 4 carbon atoms and n is an integer of 1 to 4. Among such specified N-substituted polyamides, most preferable is an N-substituted polyamide prepared by treating with an acid a polyamide in which 0.5% to 65% in number of the hydrogen atoms linked to the nitrogen atoms of the amide linkages in the main chain are substituted with substituents represented by the formula

where R' is a hydroxyl group or an alkoxy group having 1 to 4 carbon atoms and n is an integer of 1 to 4.

Further, it has been found that finely divided powders or flakes prepared by the steps of dissolving the aforesaid N-substituted polyamide in a solution of an inorganic salt such as calcium chloride, lithium chloride, aluminum chloride, magnesium chloride, aluminum nitrate, calcium nitrate, magnesium nitrate or lithium nitrate in an alkanol having 1 to 4 carbon atoms and, then, adding water thereinto by drop while stirring to thereby precipitate the N-substituted polyamide, are of a porous structure suitable for adsorbing polyphenols.

The term "vegetable beverages" used herein is intended to include fruit and vegetable juices, soft drinks, wines and beers, e.g., lager beer, porter, stout, ale and malt liquor. This term is used herein as including not only finished beverages but also unfinished beverages in the course of production.

OBJECTS OF THE INVENTION

An object of the present invention is to provide an adsorbent material for prevention of haze formation and browning in vegetable beverages.

Another object of the present invention is to provide an adsorbent material exhibiting improved selective adsorption for polyphenols, particularly anthocyanogen, present in vegetable beverages.

Still another object is to provide an adsorbent material advantageously used in the course of production of vegetable beverages.

A still further objects of the invention will be apparent from the following description and the accompanying drawings.

SUMMARY OF THE INVENTION

In accordance with the present invention, there is provided an adsorbent material in the form of finely divided powders or flakes for removal of polyphenols present in vegetable beverages, consisting essentially of a polyamide or a mixture of polyamides in which 0.5% to 65% in number of the hydrogen atoms linked to the nitrogen atoms of the amide linkages in the main chain are substituted with substituents represented by the formula

where $n$ is an integer of 1 to 4 and R is at least one member selected from a hydrogen atom, a hydroxyl group and an alkoxy group having 1 to 4 carbon atoms and Rs in the molecule are the same as or different from each other.

BRIEF DESCRIPTION OF THE DRAWINGS

The accompanying drawings illustrate the dependence of the percentage of removal of total polyphenols and isohumulones present in beer upon the degree of substitution in N-substituted polyamides. In the drawings.

DETAILED DESCRIPTION OF THE INVENTION

Figure 1:
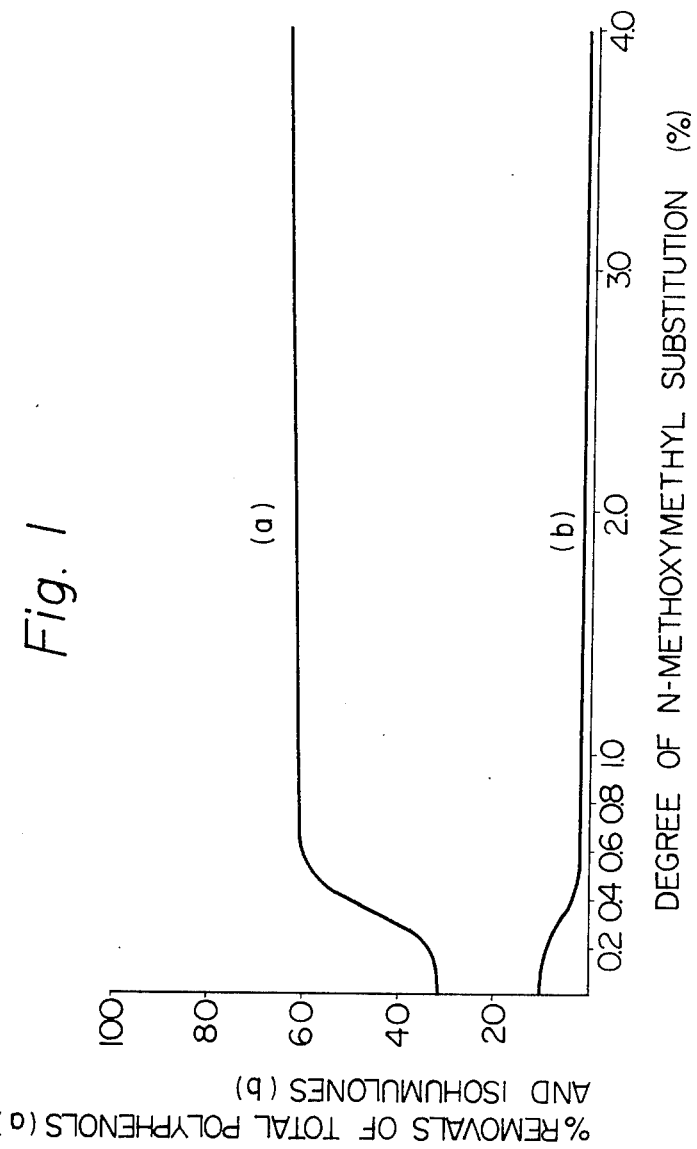
FIG. 1 shows the above mentioned dependence upon the degree of substitution with methoxymethyl groups in N-substituted nylon-6,6 (polyhexamethylene adipamide)

The polyamide of the adsorbent material of the present invention is characterized in that 0.5% to 65% in number of the hydrogen atoms linked to the nitrogen atoms of the amide linkages (—CO.NH—) in the main chains are substituted with substituents represented by the formula: —$(CH_2)_n$-R, where n is an integer of 1 to 4 and R is a hydrogen atom, a hydroxyl group or an alkoxy group having 1 to 4 carbon atoms and Rs in the molecule are the same or different from each other.

By the term "polyamide" used herein are meant condensation products which contain recurring amide groups as integral parts of the main polymer chain and are formed by dehydration or de-(hydrogen halide) condensation of a diamine or its salt and a dibasic acid or its acid halide, by self-condensation of a ω-aminocarboxylic acid or its lactam or by a combination of both types. Illustrative of preferable polyamides used in the invention are nylon-4 [-NH(CH$_2$)$_3$CO-]$_p$, nylon-6[-NH(CH$_2$)$_5$CO-]$_p$ and nylon-6,6 [-NH(CH$_2$)$_6$NH.CO(CH$_2$)$_4$CO-]$_p$. The degree of polymerization is preferably within the range from 50 to 400.

The substituents linked to the nitrogen atoms of the amide linkages in the main polymer chains include, for example, methyl, ethyl, n-propyl, iso-propyl, n-butyl and iso-butyl groups as substituents in which R is a hydrogen atom; methylol, ethylol, n-propylol and n-butylol groups as substituents in which R is a hydroxyl group; and methoxymethyl, ethoxymethyl, butoxymethyl, methoxyethyl and ethoxyethyl groups as substituents in which R is an alkoxy groups.

The N-substituted polyamides set forth above may be prepared by known procedures. For example, N-substituted polyamides in which R is a hydroxyl group are prepared by dissolving a polyamide in formic acid and then treating the solution with formaldehyde, paraformaldehyde, ethylene oxide or acetaldehyde. N-substituted polyamides in which R is an alkoxy group are prepared by treating a solution of a polyamide in formic acid with both an aliphatic aldehyde such as formaldehyde, paraformaldehyde, acetaldehyde, propionaldehyde or butylaldehyde and an alkanol having 1 to 4 carbon atoms such as methanol, ethanol, n-propanol or n-butanol, incorporating the reaction mixture into a poor solvent such as water or acetone and, then, neutralizing the mixture with aqueous ammonia to thereby form a precipitate of the intended N-substituted polyamide. Or, such N-alkoxyalkyl-substituted polyamides may be prepared by treating a polyamide directly with formaldehyde and an alkanol having 1 to 4 carbon atoms at elevated temperature and pressure in the presence of a phosphoric acid catalyst. N-substituted polyamides in which R is a hydrogen atom are prepared by condensation of a mixture of an alkylenediamine, e.g. hexamethylenediamine, and a N,N'-dialkylpolymethylenediamine, e.g. N,N'-dimethylhexamethylenediamine, or a N-alkylpolymethylenediamine, e.g. N-methylhexamethylenediamine, with a dibasic acid, e.g. adipic acid.

The degree of substitution with the aforesaid substituents in a polyamide should be at least 0.5% from a standpoint of adsorption capacity for polyphenols present in vegetable beverages. The "degree of substitution" used herein means the proportion in number of the nitrogen atoms ($N_1$) linking the aforesaid substituents to all of the nitrogen atoms ($N_2$) in the main polymer chains, expressed in terms of percent. That is, it is defined by the formula: Degree of substitution in % = ($N_1/N_2$) × 100.

Polyamides exhibit an adsorption capacity for polyphenols to some extents even when they do not have the aforesaid substituents. However, they are not satisfactory because they need to be employed in large amounts for the adsorption capacity of the desired extent and, in the case where they are employed for clarifying and stabilizing beers, they inevitably adsorb isohumulones, i.e., the most important constituents of hops for imparting a bitter taste and a pleasant aroma.

It is surprising that, when the degree of substitution with the aforesaid substituents exceeds approximately 0.5%, the N-substituted polyamides exhibit an improved adsorption capacity for polyphenols but a reduced adsorption capacity for isohumulones.

The upper limit of the degree of substitution is not critical, but it is determined depending mainly upon the solubility of the N-substituted polyamide in vegetable beverages and the thermal stability at the sterilization temperature. The solubility in vegetable beverages may be roughly in accord with the solubility in water or a mixture of water and ethanol, and the solubility in an aqueous ethanol solution of 20% concentration may be a criterion particularly for solubility in alcoholic beverages such as beers and wines. Such solubility and thermal stability depend upon the particular type of substituents, but not upon the degree of polymerization provided that the degree of polymerization is approximately within the range of 50 to 400.

For example, most of the N-substituted polyamides having a substituent, R of which is a hydroxyl group or an alkoxy group having 1 to 4 carbon atoms, are not soluble in water but become partially soluble in an aqueous 20% ethanol solution when the degree of substitution exceeds approximately 15%. Particularly, N-substituted polyamides having a substituent, R of which is an alkoxy group having 1 to 4 carbon atoms, preferably possess the degree of substitution of less than 3% because they exhibit selective adsorption for polyphenols to an extent similar to that obtained when the degree of substitution is from 3% to approximately 15%. Most of the N-substituted polyamides having a substituent, R of which is hydrogen, are not soluble even in ethanol but become poor in thermal resistance when the degree of substitution exceeds approximately 65%. The latter polyamides possess a softening point of approximately 100° C and, therefore, their finely divided powders or flakes are liable to stick to each other and to form large blocks when they are subjected to sterilization.

If the solubility of an adsorbent material in an aqueous 20% ethanol solution is less than approximately 1% at a temperature of 80° C, no problem arises in the practical use thereof. Solubilities of some typical N-substituted polyamides of the invention are shown in Table I.

Table I

| N-substituted polyamide | Degree of substitution (%) | Degree of polymerization | Solubility in 20% ethanol at 80° C (%) |
| --- | --- | --- | --- |
| N-methyl nylon-6,6 | 1 | 115 | 0.01 |
| N-methyl nylon-6,6 | 10 | 120 | 0.08 |
| N-methyl nylon-6,6 | 30 | 118 | 0.09 |
| N-methyl nylon-6,6 | 45 | 130 | 0.12 |
| N-methyl nylon-6,6 | 65 | 125 | 0.33 |
| N-methyl nylon-6,6 | 65 | 55 | 0.05 |
| N-methyl nylon-6,6 | 65 | 150 | 0.27 |
| N-isopropyl nylon-6,6 | 55 | 60 | 0.18 |
| N-methoxymethyl nylon-6,6 | 3 | 120 | 0.08 |
| N-methoxymethyl nylon-6,6 | 15 | 120 | 0.31 |
| N-methoxymethyl nylon-6 | 0.7 | 118 | 0.02 |
| N-methoxymethyl nylon-6 | 5 | 117 | 0.15 |
| N-methoxymethyl nylon-6 | 13 | 118 | 0.32 |
| N-methoxymethyl nylon-6 | 13 | 60 | 0.35 |
| N-methylol nylon-6 | 5 | 140 | 0.17 |
| N-methylol nylon-6 | 14 | 80 | 0.31 |
| N-n-butoxymethyl nylon-6 | 13 | 127 | 0.28 |
| N-methoxymethyl nylon-4 | 10 | 127 | 0.27 |

The solubility is determined as follows. One gram of the polyamide is incorporated in 200 ml of an aqueous 20% ethanol. The mixture is maintained at 80° C for a period of 30 minutes while being stirred under reflux conditions. The mixture is then filtered by using a filter having micro-openings with a diameter of 0.1 micron. The filtrate is evaporated to dryness. The solubility is the proportion in % of the weight of the dried residue to the weight of the polyamide.

The adsorbent material of the invention is in the form of finely divided powders or flakes because finely divided powders or flakes possess a large surface area per unit weight. By the term "finely divided powders" used herein is meant those which have a particle size of less than 0.2 cm on the average. By the term "finely divided flakes" used herein is meant flakes of a size of less than 0.8 cm on the average. The finely divided powders or flakes may be prepared in known manners, i.e., by pulverizing the polymer in the form of blocks by using, for example, a ball mill or hammer mill, or by stirring an aqueous suspension of the polymer at a high shearing force by using a homomixer. Alternatively, the finely divided powders or flakes may be prepared by a procedure, hereinafter set forth, wherein the polymer is dissolved in a solvent and then precipitated from the solution.

Figure 2:
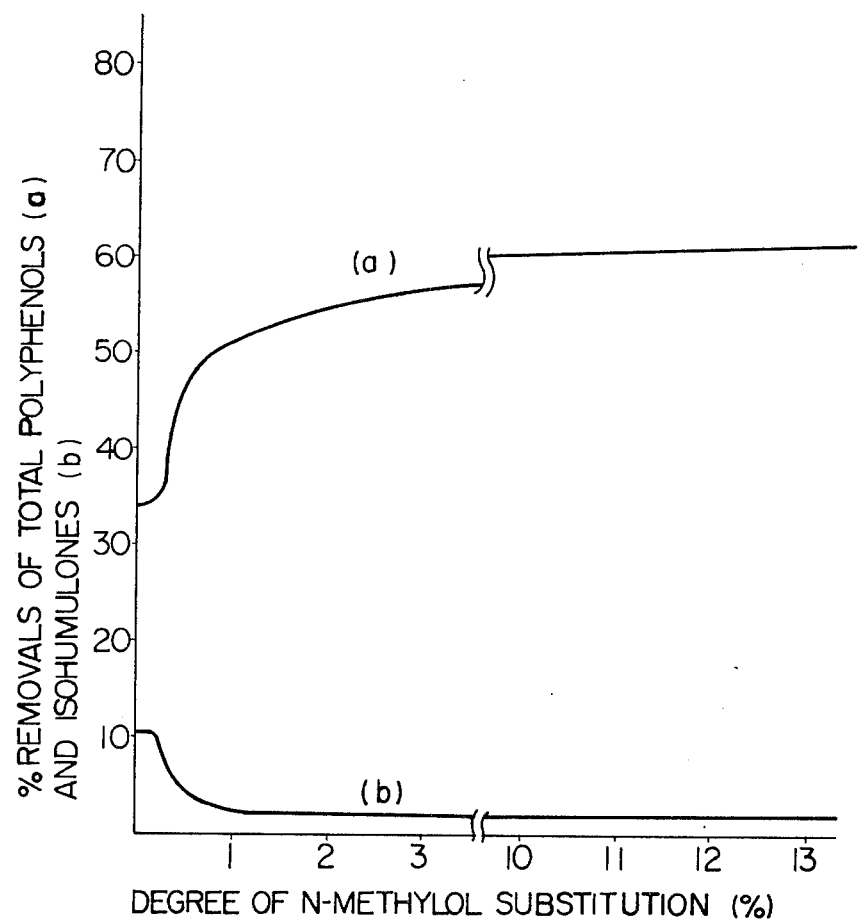
FIG. 2 shows the above-mentioned dependence upon the degree of substitution with methylol groups in N-substituted nylon-6,6.
Figure 3:
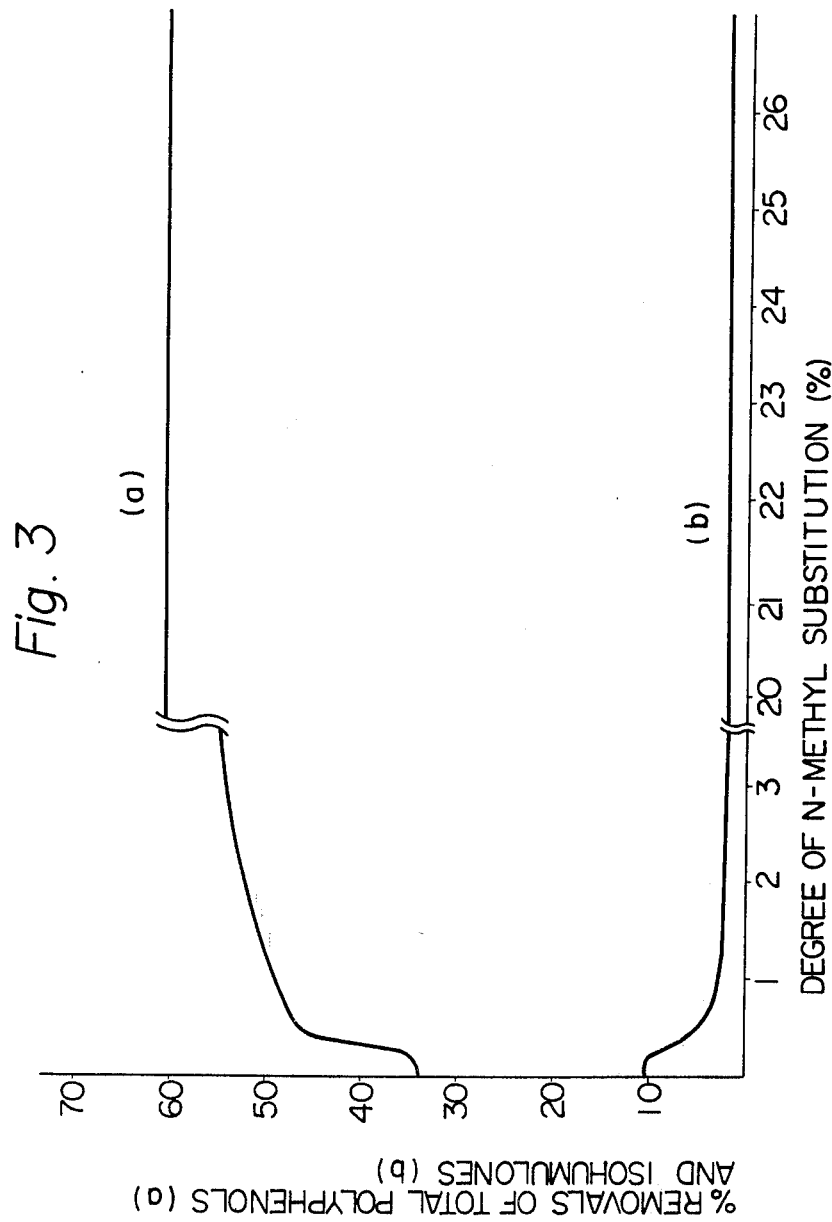
FIG. 3 shows the above-mentioned dependence upon the degree of substitution with methyl groups in N-substituted nylon-6,6.

The dependence of adsorption capacity of polyphenols and isohumulones upon the type of substituents and the degree of the substitution will be illustrated with reference to the accompanying drawings. In FIGS. 1, 2 and 3, curve (a) and curve (b) indicate the dependence of the percent of removals of total polyphenols and isohumulones, respectively, upon the degree of substitution in N-substituted nylon-6,6. The substituents in N-substituted nylons-6,6 used are methoxymethyl, methylol and methyl in FIGS. 1, 2 and 3, respectively. The adsorption tests are conducted as follows. Each N-substituted nylon-6,6 is pulverized, by using a ball mill, into finely divided powders having a particle size of 100 mesh on the average. "Mesh" as used herein means that determined according to the Tyler Standard Sieve. One g of the finely divided powders is incorporated into 100 ml of fresh beer, which is from the storage tank, has been cooled to 0° C and contains 115 ppm of polyphenols in total and 30 ppm of isohumulones. Then, the mixture is stirred for a period of five minutes and filtered by a filter paper. The total polyphenol content in the filtrate beer is determined according to Harris' method described in the Journal of the Institute of Brewing, vol. 61, page 132(1955). The isohumulone content therein is determined according to Rigby and Bethune's method described in the Journal of the Institute of Brewing, vol. 61, pages 322 and 325(1955).

As seen in FIGS. 1, 2 and 3, unsubstituted nylon-6,6 is poor in adsorption capacity for polyphenols, but in N-substituted nylon-6,6, the adsorption capacity for polyphenols is at a high level when the degree of substitution is at least approximately 5%. In contrast, the adsorption capacity for isohumulones desirably becomes a low level when the degree of substitution exceeds approximately 5%.

One preferable adsorbent material is comprised of a polyamide or a mixture of polyamides in which 0.5% to 65% in number of the hydrogen atoms linked to the nitrogen atoms of the amide linkages in the main chain are substituted with substituents represented by the formula: $-(CH_2)_n-R$, where n is an integer of 1 to 4 and R is a hydrogen atom, a hydroxyl group and an alkoxy group having 1 to 4 carbon atoms and Rs in the molecule are different from each other. This polyamide is prepared by treating a specified polyamide with an acid. The specified polyamide is such that 0.5% to 65% in number of the hydrogen atoms linked to the nitrogen atoms of the amide linkages in the main chain are substituted with substituents represented by the formula: $-(CH_2)_n-R$, where n is an integer of 1 to 4 and R is at least one member selected from a hydroxyl group and an alkoxy group having 1 to 4 carbon atoms. As mentioned hereinbefore, N-alkoxyalkyl-substituted polyamides having a degree of substitution of more than 15% are in general partially soluble in an aqueous 20% ethanol solution and, therefore, not preferable for alcoholic beverages such as beers and wines. However, the above-said polyamides prepared by the acid treatment are insoluble in an aqueous 20% ethanol solution and possess improved thermal stability.

The aforesaid acid-treated polyamides may be prepared as follows. N-hydroxy or N-alkoxyalkyl polyamide is dissolved in a lower alkanol such as methanol or ethanol or a mixture of water and such a lower alkanol. An acid is added to the polyamide solution and the solution is heated. Alternatively, N-hydroxyalkyl or N-alkoxyalkyl polyamide in the form of finely divided powders are suspended in water. An acid is added to the aqueous suspension and, then, the suspension is heated. Acids used include, for example, inorganic acids such as hydrochloric acid, sulfuric acid and phosphoric acid, and organic acids such as oxalic acid, citric acid, tartaric acid and lactic acid. The amount of an acid is preferably such that in the case of an inorganic acid, its concentration in the reaction mixture is 0.05 to 5 normalities, and in the case of an organic acid, it is 0.1 to 10% by weight based on the weight of the N-hydroxyalkyl or N-alkoxyalkyl polyamide. When the amount of an acid used exceeds the upper limit, the N-hydroxyalkyl or N-alkoxyalkyl substituent are liable to be partially hydrolyzed. The heating temperature is preferably 40° to 100° C and the heating period of time is preferably 5 to 150 minutes.

The aforesaid acid-treated polyamide is a mixture of polyamides in which the nitrogen atoms of the amide linkages in the main chain link to the following three groups.
1. $-(CH_2)_n-O-(CH_2)_mH$, where n and m are integers of 1 to 4;
2. $-(CH_2)_n-OH$, where n is an integer of 1 to 4, and;
3. $-H$.

The group (1) is an unreacted substituent in the case where the N-substituted polyamide used in an N-alkoxyalkyl polyamide. The group (2) is an unreacted substituent in the case where the N-substituted polyamide used in an N-hydroxyalkyl polyamide, and a substituent formed by dealcoholization due to partial hydrolysis in the case where the N-substituted polyamide used is an N-alkoxyalkyl polyamide. The hydrogen (3) is an unreacted hydrogen atom originally present in the N-substituted polyamide used an a hydrogen atom formed by dealdehydation and dealcoholization due to hydrolysis of the N-hydroxyalkyl or N-alkoxyalkyl substituent.

Some examples of the acid-treaded polyamide and its application for the treatment of beer will be herein illustrated. One kg of each of N-methoxymethyl nylons-6,6 having a degree of substitution of 5.2%, 9.8%, 16.4%, 31.6% and 45.1% is dissolved in 10 liters of methanol. An acid shown in Table I, below, is incorporated into each solution, and the solution is maintained at 60° C for one hour while being stirred. A precipitate so formed is separated by using a filter paper, washed with water and then dried. The dried precipitate is pulverized into fine powders having an average particle size of 100 mesh. One g of the fine powder was incorporated into 100 ml of fresh beer containing 120 ppm of polyphenols and 33 ppm of isohumulones, which beer is fresh from the storage tank and cooled to 0° C. The adsorbent-incorporated beer was stirred for 5 minutes and filtered. The contents of total polyphenols and isohumulones in the filtrate beer are determined. % Removals of total polyphenols and isohumulones are shown in Table II.

Table II

| Degree of N-methoxymethyl substitution in polyamide used (%) | Acid used | Acid-treated polyamide | | % Removal of total polyphenols | % Removal of isohumulones |
|---|---|---|---|---|---|
| | | Degree of N-methylol substitution (%) | Degree of N-methoxymethyl substitution (%) | | |
| 5.2 | HCl | 0.6 | 1.9 | 58.3 | 2.1 |
| | $H_3PO_4$ | 0.3 | 1.1 | 56.5 | 2.3 |
| | $H_2SO_4$ | 0.5 | 1.7 | 57.9 | 1.8 |
| 9.8 | HCl | 1.4 | 2.5 | 61.1 | 1.9 |
| | $H_3PO_4$ | 1.1 | 1.8 | 60.3 | 1.8 |
| | $H_2SO_4$ | 1.3 | 2.1 | 60.6 | 1.9 |
| 16.4 | HCl | 2.6 | 4.4 | 62.5 | 1.8 |
| | $H_3PO_4$ | 2.1 | 4.0 | 61.5 | 2.0 |
| | $H_2SO_4$ | 2.4 | 4.4 | 62.0 | 1.8 |
| 31.6 | HCl | 4.4 | 6.1 | 62.7 | 1.7 |
| | $H_3PO_4$ | 3.2 | 5.2 | 62.3 | 1.9 |
| | $H_2SO_4$ | 4.1 | 5.8 | 63.1 | 1.8 |
| 45.1 | HCl | 5.3 | 6.7 | 63.6 | 1.9 |
| | $H_3PO_4$ | 4.5 | 5.9 | 62.3 | 1.8 |
| | $H_2SO_4$ | 5.0 | 6.4 | 62.8 | 1.7 |

Table II shows that there is no great difference between acids both in the degree of substitution and in % removal of the polyphenols. The acid-treated nylon-6,6 exhibits enhanced removal of total polyphenols and reduced removal of isohumulones as compared with untreated nylon-6,6.

The degree of $-CH_2OCH_3$ or $-CH_2OH$ substitution in acid-treated polyamides is determined according to Levenson's method described in Industrial Engineering Chemistry, Analytical edition, Vol. 2, Page 332 (1940). That is, first, the amount of bonded formaldehyde is determined and the total amount of $=N-CH_2OCH_3$ and $-CH_2OH$ is calculated therefrom. Then, the substituents are decomposed by phosphoric acid, and the methanol produced is distilled off and adsorbed in water. The amount of the methanol is determined by gas chromatography and the amount of $=N-CH_2OCH_3$ is calculated therefrom. Said amount of $=N-CH_2OH$ is the difference between the total amount of the two substituents and $=N-CH_2OCH_3$.

The adsorbent material of the invention exhibits an improved adsorption capacity for polyphenols, particularly anthocyanogens. Further, the pH of vegetable beverages changes only to a minor extent when said vegetable beverages are treated with the adsorbent material. This means that said adsorbent material adsorbs only minor parts of pH-controlling substances such as organic acids, amino acids and protein present in vegetable beverages, that is, it selectively adsorbs polyphenols.

Some examples of the selective adsorption capacity will be herein illustrated. Adsorption capacities for polyphenols and other materials present in beer fresh from the storage tank are tested by the general procedure set forth in Example 1. The test is made on three adsorbent materials, i.e. N-methyl nylon-6,6 having a degree of substitution of 30%, nylon-6,6 and polyvinyl polypyrrolidone (hereinafter referred to as "PVPP" for the sake of brevity). The contents of polyphenols, anthocyanogens, and isohumulones, the pH, and the haze of the treated and untreated beer are shown in Table III.

Table III

| Adsorbent | Total polyphenol content (ppm) | Anthocyanogen content (ppm) | Isohumulone content (ppm) | Total content nitrogen (ppm) | pH | Haze |
| --- | --- | --- | --- | --- | --- | --- |
| N-methyl nylon-6,6 (Invention) | 39 | 11 | 34 | 452 | 4.3 | 0.5 |
| Nylon-6,6 (Control) | 62 | 22 | 31 | 415 | 4.8 | 3.6 |
| PVPP (Control) | 45 | 15 | 33 | 442 | 4.5 | 1.8 |
| Untreated (Control) | 113 | 27 | 35 | 453 | 4.2 | 5.5 |

The aforesaid determination is made according to the following methods.

Total polyphenol content: Harris' method.
Anthocyanogen content: HCl-butanol extraction method described in the Journal of the Institute of Brewing, vol. 67, page 502–506 (1961).
Isohumulone content: Rigby and Bethune's method described in the Journal of the Institute of Brewing, vol. 61, page 322, 325 (1955).
Total nitrogen content: Kieldahl's method described in Fresenius' Zeitschrift fur Analytische Chemie, vol. 22, page 366 (1883). The total nitrogen content may be an approximate yard stick for the content of amino acids and protein.
Haze: The adsorbent-treated beer is filtered. The filtrate beer is bottled and left to stand for a period of one month at 0° C. The haze is then determined by using a haze meter and expressed in EBC Formazin Haze Units.

One preferable form of the adsorbent material of the invention is a finely divided powder or flake having a porous structure. Such a finely divided porous powder or flake is formed by dissolving the N-substituted polyamide in an alkanol of 1 to 4 carbon atoms having, incorporated therein, an inorganic salt such as calcium chloride, lithium chloride, aluminum chloride, magnesium chloride, aluminum nitrate, calcium nitrate, magnesium nitrate and lithium nitrate, and then adding water to said solution while being stirred, thereby forming a precipitate having the intended form. The N-substituted polyamide is soluble in such a lower alkanol having an inorganic salt incorporated therein.

Said inorganic salts may be used alone or in combination. The amount of said inorganic salt is preferably 5 to 80% by weight based on the weight of the inorganic salt solution in alkanol, from a standpoint of the adsorption capacity of the resulting porous structure.

The amount of the N-substituted polyamide dissolved in the inorganic salt-alkanol solution is preferably such that the concentration of the N-substituted polyamide in the resulting solution is at most 15%. When the amount of the N-substituted polyamide is too small, the resulting precipitate is in the form of a finely divided powder having a low porosity. When said amount increases, the precipitate becomes porous and flake-like. However, when said amount exceeds approximately 15%, the resulting precipitate is sometimes of the form of flakes or small blocks which are relatively hard and poor in porosity. A more preferable range is 5 to 14%, wherein adsorbent materials of the desired porosity can be easily produced with a good yield.

The reason for the formation of porous powders or flakes cannot be clearly explicated, but it is presumed that when the N-substituted polyamide is incorporated into the solution of an inorganic salt in alkanol, the inorganic salt is combined with the N-substituted and unsubstituted amide linkages of the polyamide. Thus, when water is added thereto, a precipitate is formed which is of such a structure that the polyamide particles contain said inorganic salt. Upon washing the precipitate, said inorganic salt oozes out from the polyamide particles whereby the particles become porous.

An example showing the advantage of such a porous adsorbent material will be herein illustrated. Three lots (each 10 g) of N-methyl nylon-6,6 having a degree of substitution of 25% are separately dissolved in 100 ml of methanol having 20% of an inorganic salt incorporated therein. The inorganic salts used are calcium chloride, lithium chloride and aluminum nitrate. Water was gradually added by drop to each solution while being stirred, thereby forming flake-like precipitate. Said precipitate is separated, washed with water and then dried. The dried precipitate is tested for its adsorption capacity of polyphenols present in beer by the general procedure set forth in Example 2. The results are shown in Table IV.

Table IV

| Adsorbent | Total polyphenol content in treated beer (ppm) |
| --- | --- |
| Pulverized by ball mill | 40 |
| Precipitated from CaCl$_2$/methanol | 33 |
| Precipitated from LiCl/methanol | 34 |
| Precipitated from Al(NO$_3$)$_3$/methanol | 34 |
| Untreated | 115 |

In a method wherein porous adsorbent materials are formed from a solution of the N-substituted polyamide and an inorganic salt in alkanol, finely divided inorganic substance insoluble in both water and alkanol may be added to said solution of the polyamide and the inorganic salt prior to the addition of water thereto. When such finely divided inorganic substance is used, the resulting precipitate is in a composite form in such a way that each particle of the finely divided inorganic substance is partially or entirely covered with the polyamide in a closely adherent state.

The insoluble inorganic substance used includes, for example, silica gel, diatomaceous earth, active carbon, montmorillonite, talc, kaolinite and bentonite. It also includes hydroxides and hydrated oxides of zirconium, titanium and aluminum. These inorganic substances may be used either alone or in combination. The amount of the insoluble inorganic substance is not critical and may be up to 99.5% by weight based on the total weight of the insoluble inorganic substance and the polyamide.

Active carbon possesses a very large adsorption capacity for various materials including polyphenols. When beer is treated therewith, and isohumulones, protein and coloring matters are undesirably adsorbed thereby. However, the composite form of active carbon at least partially covered with the N-substituted exhibits a good adsorption capacity for polyphenols but a reduced adsorption capacity for isohumulones, protein and coloring matters. Other inorganic substances such as silica gel, diatomaceous earth, montmorillonite, and hydroxides and hydrated oxides of zirconium, titanium and aluminum exhibit an adsorption capacity for polyphenols present in vegetable beverages. However, the composite form consisting of the insoluble inorganic substance at least partially covered with the N-substituted polyamide exhibits an enhanced adsorption capacity.

The adsorbent material in the form of finely divided powders or flakes may be used either as it is or in another suitable form such as a filter sheet. That is, a vegetable beverage may be brought into contact with said adsorbent material as follows. For example, the finely divided powders or flakes are packed in a column to form their bed therein, and a vegetable beverage is passed therethrough. Or, the finely divided powders or flakes are incorporated into a vegetable beverage. The mixture is stirred and the powders or flakes are then filtered out therefrom. A vegetable beverage may be passed through a filter in another suitable form such as a sheet formed from said finely divided powders or flakes and cellulose pulp. The latter procedure is advantageous in that the filter sheet can be fitted into conventional fiters and it is easy to treat the beverage therewith and to clean after using.

The filter sheet is prepared from an aqueous dispersion of a mixture of the finely divided polyamide powders or flakes and cellulose pulp by a procedure similar to that in the conventional papermaking process. Conventional papermaking machines such as a Fourdrinier machine, a cylinder mould machine and a hand-sheet machine may be employed. The cellulose pulp used is not critical, but conifer pulp is preferred rather than broadleaf wood pulp because the former has a fiber length larger than that of the latter and is capable of supporting the polyamide particles to a greater extent. The type of cellulose pulp is also not critical, and, for example, sulfite pulp, sulfate pulp, alkali pulp and mechanical pulp may be employed. Both bleached and unbleached pulps may be employed. The amount of the N-substituted polyamide is preferably within the range of 5 to 80% by weight based on the total weight of the polyamide and cellulose pulp.

In the preparation of the aforesaid filter sheet, a finely divided inorganic substance may be incorporated in the aqueous dispersion of the polyamide and cellulose pulp. Finely divided inorganic substances used include, for example, those which were hereinbefore illustrated as insoluble inorganic substances. Their amount is preferably 5 to 40% by weight based on the weight of the resulting sheet.

The adsorbent material of the invention can be used for both finished and unfinished vegetable beverages. For example, it is advantageously used for the treatment of beer fresh from the fermenter or the storage tank. Both wine immediately before bottling and unfermented grape juice can be treated. The treatment of beer fresh from the fermenter is particularly advantageous because the period of storage can be shortened. That is, according to a conventional process, beer from the fermenter is stored in a tank for a period of two or three months in order to settle turbid beer containing minute particles formed by the association of polyphenols and protein.

The adsorbent material of the invention can be repeatedly used. The cleaning of said adsorbent material after use may be effected, for example, by placing said adsorbent material in an aqueous solution of sodium hydroxide, potassium hydroxide or sodium chloride, or passing such an aqueous solution through the bed or filter sheet of said adsorbent material. The aqueous solution is used preferably at a temperature of 60° to 100° C. and at a concentration of 0.1 to 1.5 moles per liter. The cleaned adsorbent material possesses an adsorbent capacity equal to that before use, as substantiated in the following example.

5 g of N-ethyl nylon-6,6 having a degree of substitution of 33% are dissolved in 100 ml of methanol containing 20% by weight of calcium chloride. 150 ml of water is gradually added to the solution while being stirred over a period of 10 minutes. The precipitate of flake-like particles so formed is separated by a filter paper, washed with water and then dried. The dried particles are tested for their adsorption capacity for polyphenols, using beer containing 125 ppm of polyphenols. The test procedure is similar to that in Example 2. After the adsorbent particles used are separated from the treated beer, the particles are placed in 100 ml of an aqueous 4% sodium hydroxide solution. The mixture is maintained at 60° C for 30 minutes while being gently stirred, and then filtered using a glass filter. The particles on the filter are washed with water repeatedly until no sodium hydroxide is detected in the water used. The particles are then dried at 80° C for 1 hour. This procedure of treating beer and cleaning the adsorbent material used is repeated. The results are shown in Table V.

Table V

| Number of test repeated | Untreated | 1 | 2 | 3 | 4 | 5 | 6 | 7 | 8 | 9 | 10 |
| --- | --- | --- | --- | --- | --- | --- | --- | --- | --- | --- | --- |
| Total polyphenol content (ppm) | 125 | 42 | 43 | 42 | 42 | 43 | 42 | 41 | 42 | 43 | 43 |
| % Recovery* | — | — | 98 | 100 | 100 | 98 | 100 | 102 | 100 | 98 | 98 |

*% Recovery = (Amount of total polyphenols removed/amount of total polyphenols removed at the 1st time) × 100.

MODE OF OPERATION OF THE INVENTION

The invention will now be illustrated in detail by the following examples, wherein % are by weight except for % degree of substitution.

EXAMPLE 1

130 g (1 mole) of N-methylhexamethylenediamine, 116 g (1 mole) of hexamethylenediamine and 292 g (2 moles) of adipic acid were incorporated in a mixture of 2,200 g of an aqueous 95% ethanol and 335 g of water, followed by heating to 80° C. The solution so prepared was cooled to 10° C to form a crystal of N-methyl nylon-6,6 salt (adipate of N-methylhexamethylenediamine). The N-methyl nylon-6,6 salt was filtered by using a quantitative filter paper, recrystallized from an ethanol-water mixture similar to the above and again filtered by using a quantitative filter paper.

120 g of the N-methyl nylon-6,6 salt crystal was dissolved in 80 g of water, followed by addition of 0.2 g of stearic acid. The solution so obtained was placed in an autoclave. After being flashed with nitrogen, the content was maintained at 220° C and 18 kg/cm for a period of 2 hours to effect polycondensation. Then, the temperature was elevated to 280° C while the pressure was gradually reduced to normal pressure and maintained under those conditions for a period of 3 hours to complete polycondensation. The polymer obtained was melt-extruded through a nozzle having a circular orifice of 1.5 mm diameter and immediately introduced into a water bath and, finally, cut into chips of 5 mm length. 5 g of the chips were ground into finely divided powders having a particle size of 100 mesh in average by using an agate mortar.

The degree of substitution with a methyl group in the N-methyl nylon-6,6 was determined according to Haberland's method described in Berichte der deutschen chemischen Gesellschaft, Vol. 65, page 127 (1932). The degree of polymerization was determined according to the method for measuring the content of the end amino and carboxyl groups, described in Kline: Analytical Chemistry of Polymers, Part I, Monomers and Polymeric materials, Interscience Publishers, Inc., New York, pages 289–292 (1959). The solubility in an aqueous 20% ethanol solution was determined in a manner hereinafter set forth. Results were as follows.

| Degree of substitution with —CH$_3$ | 24.7% |
| Degree of polymerization | 122 |
| Solubility in 20% ethanol | 0.07% |

One g of the N-methyl nylon-6,6 powder was incorporated in 100 ml of fresh beer which was from the storage tanks and cooled to 0° C. After the beer was stirred for 5 minutes, it was filtered by using a quantitative filter paper, and then, the filtrate beer was tested for its total phenol content, anthocyanogen content, isohumulone content and pH. Results are shown in Table VI, below.

For comparison purposes, finely divided powders of nylon-6,6 and PVPP were separately tested for their adsorption capacity in a manner similar to the above. Results are shown in Table VI.

Table VI

| Run No. | Adsorbent | Total polyphenol content (ppm) | Anthocyanogen content (ppm) | Isohumulone content (ppm) | pH |
| --- | --- | --- | --- | --- | --- |
| 1 | N-methyl nylon-6,6 (Invention) | 39 | 14 | 26 | 4.3 |
| 2 | Nylon-6,6 (Control) | 63 | 21 | 24 | 4.7 |
| 3 | PVPP (Control) | 47 | 18 | 26 | 4.4 |
| 4 | Untreated (Control) | 119 | 28 | 27 | 4.2 |

EXAMPLE 2

144 g of N-ethylhexamethylenediamine and 146 g of adipic acid were incorporated in a mixture of 1,100 g of an aqueous 95% ethanol and 180 g of water, followed by heating to 70° C. The solution as prepared was cooled to 15° C to form a crystal of N-ethyl nylon-6,6 salt (adipate of N-ethylhexamethylenediamine). The N-ethyl nylon-6,6 salt was filtered by using a quantitative filter paper, recrystallized from an ethanol-water mixture similar to the above and again filtered by using a quantitative filter paper.

120 g of the N-ethyl nylon-6,6 salt crystal was dissolved in 80 gms of water, followed by addition of 0.2 g of acetic acid. The solution so obtained was placed in an autoclave. After being flashed with nitrogen, the content was maintained at 210° C and 17.5 kg/cm for a period of 2.5 hours to effect polycondensation. Then, the temperature was elevated to 280° C while the pressure was gradually reduced to normal pressure and maintained under those conditions for a period of 3 hours to complete polycondensation. The polymer obtained was melt-extruded through a nozzle having a circular orifice of 1.5 mm diameter and immediately introduced in a water bath and, finally, cut into chips of 4 mm length. 5 g of the chips were ground into finely divided powders having a particle size of 100 mesh in average by using an agate mortar.

The N-ethyl nylon-6,6 was tested for its degree of substitution with an ethyl group, degree of polymerization and solubility in an aqueous 20% ethanol solution in manners similar to those in Example 1. Results were as follows.

| Degree of substitution with —C$_2$H$_5$ | 50.0% |
| Degree of polymerization | 108 |
| Solubility in 20% ethanol | 0.09% |

Following the procedure set forth in Example 1, the adsorption capacity for polyphenols and isohumulones present in beer was tested, wherein the N-ethyl nylon-6,6 powder was incorporated in fresh beer which was from the fermenter and cooled to 0° C. with all other conditions remaining substantially the same. For comparison purposes, this procedure was repeated on the finely divided powders of nylon-6,6 and PVPP. Results are shown in Table VII.

Table VII

| Run No. | Adsorbent | Total polyphenol content (ppm) | Anthocyanogen content (ppm) | Isohumulone content (ppm) | pH |
|---|---|---|---|---|---|
| 1 | N-ethyl nylon-6,6 (Invention) | 40 | 13 | 32 | 4.2 |
| 2 | Nylon-6,6 (Control) | 64 | 20 | 29 | 4.6 |
| 3 | PVPP (Control) | 49 | 16 | 31 | 4.3 |
| 4 | Untreated (Control) | 123 | 27 | 32 | 4.1 |

EXAMPLE 3

2 g of N-n-butylhexamethylenediamine, 115 g hexamethylenediamine and 146 g of adipic acid were incorporated in a mixture of 1,100 g of an aqueous 95% ethanol and 180 g of water, followed by heating to 80° C. The solution was cooled to 10° C to form a crystal of N-n-butyl nylon-6,6 salt (adipate of N-n-bytylhexamethylenediamine). The N-n-butyl nylon-6,6 salt crystal was purified in a manner similar to that in Example 1.

120 g of the N-n-bytyl nylon-6,6 salt crystal was dissolved in 80 g of water, followed by addition of 0.2 g of an aqueous 85% phosphoric acid. The solution was placed in an autoclave and polycondensation was effected in a manner similar to that in Example 1. The polymer obtained was shaped into chips of 4 mm length in a manner similar to that in Example 2. 100 g of the chips were ground into finely divided powders having a particle size of 100 mesh in average by using a ball mill.

The N-n-butyl nylon-6,6 exhibited the following characteristics.

| | |
|---|---|
| Degree of substitution with n-$C_4H_9$ | 0.8% |
| Degree of polymerization | 117 |
| Solubility in 20% ethanol | 0.02% |

Following the procedure set forth in Example 2, the adsorption capacity for polyphenols and isohumulones present in beer was tested. For comparison purposes, this procedure was repeated on the finely divided powdered of nylon-6,6 and PVPP. Results are shown in Table VIII.

Table VIII

| Run No. | Adsorbent | Total polyphenol content (ppm) | Anthocyanogen content (ppm) | Isohumulone content (ppm) | pH |
|---|---|---|---|---|---|
| 1 | N-n-butyl nylon-6,6 (Invention) | 41 | 12 | 33 | 4.3 |
| 2 | Nylon-6,6 (Control) | 64 | 19 | 30 | 4.6 |
| 3 | PVPP (Control) | 48 | 15 | 33 | 4.3 |
| 4 | Untreated (Control) | 121 | 26 | 34 | 4.2 |

EXAMPLE 4

100 g of nylon-6,6 chips were dissolved in 350 g of an aqueous 90% formic acid at 60° C. To this solution, a solution of 15 g paraformaldehyde dissolved in 30 ml of water at 60° C was added gradually over a period of 10 minutes, and maintained at 60° C for a period of 10 minutes. Then, 50 ml of water maintained at 60° C was added thereto and maintained at 60° C for a period of 15 minutes. Then, the reaction mixture was poured into a mixture of 500 ml of water and 500 ml of acetone. To this solution, 1.5 liters of water were gradually added over a period of 15 minutes to precipitate fine particles of N-methylol nylon-6. The precipitate was filtered by using a quantitative filter paper, washed with water five times, neutralized with an aqueous 1% ammonia, further washed with water and, finally, washed with acetone. Then, the N-methylol nylon-6 was dried at 70° C for 1 hour. 3 g of the dried N-methylol nylon-6 were ground into finely divided powders having a particle size of 100 mesh in average by using an agate mortar.

The N-methylol nylon-6 exhibited the following characteristics.

| | |
|---|---|
| Degree of substitution with —$CH_2OH$ | 3.2% |
| Degree of polymerization | 123 |
| Solubility in 20% ethanol | 0.08% |

Following the procedure set forth in Example 2, the adsorption capacity was tested. For comparison purposes, this procedure was repeated on finely divided nylon-6 powders. Results are shown in Table IX.

Table IX

| Run No. | Adsorbent | Total polyphenol content (ppm) | Anthocyanogen content (ppm) | Isohumulone content (ppm) | pH |
|---|---|---|---|---|---|
| 1 | N-methylol nylon-6 (Invention) | 36 | 12 | 31 | 4.2 |
| 2 | Nylon-6 (Control) | 60 | 18 | 29 | 4.5 |
| 3 | Untreated (Control) | 113 | 25 | 32 | 4.2 |

EXAMPLE 5

10 g of finely divided nylon-6 powders and 10 g of liquid ethylene oxide maintained at 0° C were placed in a 150 ml stainless steel cylindrical autoclave. After being sealed, the autoclave was maintained at 80° C in a water bath for a period of 5 hours. After being cooled, the reaction product was washed with water.

Unreacted ethylene oxide and by-products, i.e., glycol and polyethylene glycol, were separated therefrom. Then, the reaction product was dried at 50° C in a vacuum drier. 3 g of the dried product were ground into finely divided powders having a particle size of 100 mesh in average by using an agate mortar.

The N-hydroxyethyl nylon-6 so obtained exhibited the following characteristics.

| | |
|---|---|
| Degree of substitution with —C₂H₄OH | 13.2% |
| Degree of polymerization | 140 |
| Solubility in 20% ethanol | 0.07% |

Following the procedure set forth in Example 1, the adsorption capacity was tested. For comparison purposes, this procedure was repeated on finely divided nylon-6,6 powders. Results are shown in Table X.

Table X

| Run No. | Adsorbent | Total polyphenol content (ppm) | Anthocyanogen content (ppm) | Isohumulone content (ppm) | pH |
|---|---|---|---|---|---|
| 1 | N-hydroxyethyl nylon-6 (Invention) | 38 | 13 | 32 | 4.3 |
| 2 | Nylon-6,6 (Control) | 61 | 19 | 30 | 4.6 |
| 3 | Untreated (Control) | 117 | 27 | 33 | 4.2 |

EXAMPLE 6

100 g of nylon-6,6 were dissolved in 200 gms of a aqueous 95% formic acid at 60° C. To this solution, a solution of 5 g of paraformaldehyde dissolved in 5 g of methanol was gradually added and maintained at 60° C for a period of 10 minutes. Then, 10 g of methanol was added thereto and maintained at 60° C for a period of 20 minutes. The reaction mixture was poured into a mixture of 800 ml of water and 800 ml of acetone. To this solution, 300 gms of an aqueous ammonia was gradually added to precipitate fine particles of N-methoxymethyl nylon-6,6. The precipitate was filtered by using a quantitative filter paper, washed with water and then with acetone and, finally, dried at 50° C for 1 hour in a vacuum dryer. The dried N-methoxymethyl nylon-6,6 was ground into finely divided powders having a particle size of 100 mesh in average by using a ball mill.

The N-methoxymethyl nylon-6,6 exhibited the following characteristics.

| | |
|---|---|
| Degree of substitution with —CH₂OCH₃ | 0.7% |
| Degree of polymerization | 139 |
| Solubility in 20% ethanol | 0.02% |

Following the procedure set forth in Example 1, the adsorption capacity was tested. For comparison purposes, this procedure was repeated on finely divided nylon-6,6 powders. Results are shown in Table XI.

Table XI

| Run No. | Adsorbent | Total polyphenol content (ppm) | Anthocyanogen content (ppm) | Isohumulone content (ppm) | pH |
|---|---|---|---|---|---|
| 1 | N-methoxymethyl nylon-6,6 (Invention) | 37 | 12 | 30 | 4.4 |
| 2 | Nylon-6,6 (Control) | 55 | 18 | 27 | 4.5 |
| 3 | Untreated (Control) | 113 | 26 | 31 | 4.3 |

EXAMPLE 7

100 gms of finely divided N-methoxymethyl nylon-6 having a degree of substitution of 30% (trade name "Toresin F-30" supplied by Teikoku Kagaku Sangyo, Japan) were incorporated in 200 ml of an aqueous 1N HCl solution and maintained at 50° C for a period of one hour. The reaction product, i.e. a precipitate formed, was filtered by using a quantitative filter paper and the precipitate on the filter paper was repeatedly washed with water until the filtrate contains no HCl. Then, the precipitate was dried at 80° C for a period of 2 hours in a hot air dryer. The dried product was ground into finely divided powders having a particle size of 100 mesh in average.

These polymer powders exhibited the following characteristics.

| | |
|---|---|
| Degree of substitution with —CH₂OH | 7.1% |
| Degree of substitution with —CH₂OCH₃ | 5.2% |
| Degree of polymerization | 117 |
| Solubility in 20% ethanol | 0.28% |

Following the procedure set forth in Example 2, the adsorption capacity was tested. For comparison purposes, this procedure was repeated on finely divided powders of nylon-6,6 and PVPP. Results are shown in Table XII.

Table XII

| Run No. | Adsorbent | Total polyphenol content (ppm) | Anthocyanogen content (ppm) | Isohumulone content (ppm) | pH |
|---|---|---|---|---|---|
| 1 | Acid-treated N-methoxymethyl nylon-6 (Invention) | 38 | 13 | 26 | 4.3 |
| 2 | Nylon-6,6 (Control) | 63 | 21 | 24 | 4.7 |

Table XII-continued

| Run No. | Adsorbent | Total polyphenol content (ppm) | Anthocyanogen content (ppm) | Isohumulone content (ppm) | pH |
|---|---|---|---|---|---|
| 3 | PVPP (Control) | 47 | 17 | 26 | 4.4 |
| 4 | Untreated (Control) | 119 | 28 | 27 | 4.2 |

EXAMPLE 8

100 gms of nylon-6,6 were dissolved in 200 gms of formic acid. 20 gms of acetaldehyde were added to this solution and maintained at 70° C while being gently stirred. 200 ml of ethanol were gradually added to the solution followed by stirring. The reaction product of a semidissolved state was N-ethoxyethyl nylon-6,6 having a degree of substitution of 28%. 500 ml of an aqueous 0.1N hydrochloric acid were gradually added to this reaction product and vigorously stirred to form a precipitate. The precipitate was separated from the reaction mixture by using a quantitative filter paper and, again, treated with 200 ml of an aqueous 1N hydrochloric acid at 60° C for 30 minutes. The precipitate formed was separated by filtration, neutralized with an aqueous 3% ammonia, washed with water and, then, dried in a manner similar to that in Example 7. The dried product was ground into finely divided powders having a particle size of 100 mesh in average by using a ball mill.

These polymer powders exhibited the following characteristics.

| | |
|---|---|
| Degree of substitution with —$C_2H_4OH$ | 3.1% |
| Degree of substitution with —$C_2H_4OC_2H_5$ | 6.4% |
| Degree of polymerization | 145 |
| Solubility in 20% ethanol | 0.24% |

Following the procedure set forth in Example 2, the adsorption capacity was tested. For comparison purposes, this procedure was repeated on finely divided powders of nylon-6,6 and PVPP. Results are shown in Table XIII.

Table XIII

| Run No. | Adsorbent | Total polyphenol content (ppm) | Anthocyanogen content (ppm) | Isohumulone content (ppm) | pH |
|---|---|---|---|---|---|
| 1 | Acid-treated N-ethoxyethyl nylon-6,6 (Invention) | 40 | 12 | 32 | 4.2 |
| 2 | Nylon-6,6 (Control) | 64 | 20 | 29 | 4.6 |
| 3 | PVPP (Control) | 49 | 16 | 31 | 4.3 |
| 4 | Untreated (Control) | 123 | 27 | 32 | 4.1 |

EXAMPLE 9

100 g of nylon-4 were dissolved in 200 gms of formic acid. 30 g of propylaldehyde were added to this solution and maintained at 70° C for 1 hour while being stirred. 300 ml of n-butanol were gradually added to the solution and stirred. The reaction product of a semi-dissolved state was N-butoxypropyl nylon-4 having a degree of substitution of 14%. 500 ml of an aqueous 0.1N sulfuric acid were gradually added to the reaction product and vigorously stirred to form a precipitate. The precipitate was separated by using a quantitative filter paper, neutralized with an aqueous ammonia, washed with water and then dried at 70° C for 3 hours in a hot air drier. The dried product was ground into finely divided powders having a particle size of 150 mesh in average by using a ball mill.

These polymer powders exhibited the following characteristics.

| | |
|---|---|
| Degree of substitution with —$C_4H_8OH$ | 1.5% |
| Degree of substitution with —$C_3H_6OC_4H_9$ | 4.5% |
| Degree of polymerization | 97 |
| Solubility in 20% ethanol | 0.08% |

Following the procedure set forth in Example 2, the adsorption capacity was tested. For comparison purposes, this procedure was repeated on finely divided powders of nylon-6,6 and PVPP. Results are shown in Table XIV.

Table XIV

| Run No. | Adsorbent | Total polyphenol content (ppm) | Anthocyanogen content (ppm) | Isohumulone content (ppm) | pH |
|---|---|---|---|---|---|
| 1 | Acid-treated N-butoxypropyl nylon-4 (Invention) | 39 | 11 | 33 | 4.3 |
| 2 | Nylon-6,6 (Control) | 64 | 19 | 30 | 4.6 |
| 3 | PVPP (Control) | 48 | 15 | 33 | 4.3 |
| 4 | Untreated (Control) | 121 | 26 | 34 | 4.2 |

EXAMPLE 10

10 g of N-methoxymethyl nylon-6 having a degree of substitution of 18%, supplied by Teikoku Kagaku Sangyo, Japan, were dissolved in 90 g of methanol. 1.5 ml of an aqueous 85% phosphoric acid were added to the solution and the solution was maintained at 60° C while being vigorously stirred. The precipitate so formed was separated by using a quantitative filter paper, washed with water, neutralized with an aqueous ammonia, again washed with water and, then, dried at 105° C for 2 hours in a hot air dryer. The dried product was ground into finely divided powders having a particle size of 150 mesh in average by using a ball mill.

These polymer powders exhibited the following characteristics.

| | |
|---|---|
| Degree of substitution with —CH$_2$OH | 4.5% |
| Degree of substitution with —CH$_2$OCH$_3$ | 3.7% |
| Degree of polymerization | 127 |
| Solubility in 20% ethanol | 0.23% |

5 g of the aforesaid polymer powders were incorporated in one liter of white wine and the wine was gently stirred for a pariod of one hour. Then, the wine was filtered by using a quantitative filter paper. The filtrate was tested for its transmittance to the light of 450 m$\mu$ wave length by using a spectrophotometer. The transmittance was determined with reference to water. For comparison purposes, the transmittance was determined on the untreated white wine. The transmittance was as follows.

| | |
|---|---|
| Untreated white wine | 79.5% |
| Treated white wine | 88.7% |

EXAMPLE 11

5 g of each of the finely divided adsorbent materials set forth in Examples 1, 4 and 10 were dissolved in 100 ml of methanol having 20% of calcium chloride incorporated therein. To this solution, 400 ml of water were gradually added over a period of 10 minutes while being stirred, to thereby form a precipitate in the form of porous flakes. The flakes were separated by using a filter paper and, then, dried at 70° C for 2hours in a hot air dryer.

Following the procedure set forth in Example 1, the adsorption capacity of the flakes for polyphenols present in beer was tested. For comparison purposes, this test was repeated on the finely divided adsorbent materials of Examples 1, 4 and 10. Results are shown in Table XV.

Table XV

| Run No. | Adsorbent | Total polyphenol content (ppm) | Anthocyanogen content (ppm) |
|---|---|---|---|
| 1 | Powders of Example 1 | 37 | 13 |
| 2 | Porous flakes therefrom | 31 | 9 |
| 3 | Powders of Example 4 | 38 | 12 |
| 4 | Porous flakes therefrom | 31 | 10 |
| 5 | Powders of Example 10 | 38 | 12 |
| 6 | Porous flakes therefrom | 32 | 9 |
| 7 | Untreated (Control) | 117 | 27 |

EXAMPLE 12

N-methyl nylon-6,6 similar to that prepared in Example 1 was dissolved in 500 ml of ethanol having 25% lithium chloride incorporated therein. 2 litres of water were gradually added to the solution over a period of 15 minutes while being stirred, to thereby form a precipitate in the form of porous powders. The precipitated powders were separated by using a quantitative filter, washed with water and then with acetone and, then, dried at 50° C for 1 hour. 30 g of the dried powders were placed in 10$l$ of water together with 40 g of bleached conifer kraft pulp having a beating degree of 25° SR followed by mixing. From this aqueous mixture, a sheet having a thickness of 4 mm and an apparent density of 0.4 g/cm$^3$ was manufactured by using a sheet machine. The sheet was cut into a circular sheet of 50 cm$^2$ area. The circular sheet was fitted in a Millipore filter having an effective area of 45 cm$^2$. . 10 liters of beer fresh from the storage tank and cooled to 0° C were passed through the filter at a rate of 1,000$l$/(m$^2$hr.) The total polyphenol content, anthocyanogen content and isohumulone content were determined on the filtrate, i.e. treated beer, and the untreated beer. Percents of removal of polyphenols were calculated therefrom. Results are as follows.

| % Removal of polyphenols | |
|---|---|
| Total polyphenols | 30.5% |
| Anthocyanogens | 51.2% |
| Isohumulones | 1.5% |

EXAMPLE 13

One kg of N-methoxymethyl nylon-6 having a degree of substitution of 30%, supplied by Teikoku Kagaku Sangyo, Japan, was dissolved in 10 liters of methanol. This solution was placed in three vessels each in three liters. 10 g of an aqueous 37% hydrochloric acid, 10 g of an aqueous 50% sulfuric acid and 35 g of an aqueous 85% phosphoric acid were separately added to the respective vessels. Each content of the respective vessels was maintained at 60° C for a period of 2 hours to thereby form a precipitate. The precipitate was separated by using a quantitative filter paper, washed with water and, then, dried at 80° C hours in a hot air dryer. The dried product was ground into finely divided powders having a particle size of 150 mesh in average by using a ball mill.

90 g of the aforesaid powders were placed in 10 liters of water together with 110 g of bleached conifer kraft pulp, followed by mixing. From this aqueous mixture, a sheet having a thickness of 3.7 mm and an apparent density of 0.4 g/cm$^3$ was manufactured by using a sheet machine. The sheet was cut into a circular sheet of 50 cm$^2$ area. The circular sheet was fitted in a Millipore filter having an effective area of 45 cm$^2$. 10 liters of beer frech from the fermenter and cooled to 0° C were passed through the filter at a rate of 1,200 liters/(m$^3$·hr) by a compressed carbon dioxide gas of 0.5 kg/cm$^2$ pressure. 200 ml of the beer filtrate were put into a pasteurized 250 ml bottle and the bottle was provided with a cup. The bottle was allowed to stand at 0° C for a period of 1 month. Then, the haze of the stored beer was determined by using a haze-meter. Results are shown in Table XVI.

Also, the total polyphenol content, the anthocyanogen content and the isohumulone content were determined on the beer filtrate prior to the bottling. Results are shown in Table VXI.

Also, the total polyphenol content, the anthocyanogen content and the isohumulone content were determined on the beer filtrate prior to the aforesaid bottling. Results are shown in Table XVII.

Table XVII

| Run No. | Adsorbent | Total polyphenol content (ppm) | Anthocyanogen content (ppm) | Isohumulone content (ppm) | Haze (EBC unit) |
|---|---|---|---|---|---|
| 1 | Untreated (Control) | 116 | 27 | 32 | 5.7 |
| 2 | HCl-treated N-methoxymethyl nylon-6 (Invention) | 39 | 9 | 31 | 0.4 |
| 3 | $H_2SO_4$-treated N-methoxymethyl nylon-6 (Invention) | 32 | 10 | 32 | 0.5 |
| 4 | $H_3PO_4$-treated N-methoxymethyl nylon-6 (Invention) | 31 | 9 | 31 | 0.4 |

For comparison purposes, filter sheets were prepared from a mixture of a finely divided nylon-6,6 powder of 150 mesh and bleached conifer kraft pulp and from a mixture of a finely divided powder of 150 mesh and the same pulp, respectively. The sheets were tested for their adsorbent capacity for polyphenols and isohumulones present in beer, by procedures similar to those set forth above. Results are shown in Table XVI.

Table XVI

| Run No. | Adsorbent | Total polyphenol content (ppm) | Anthocyanogen content (ppm) | Isohumulone content (ppm) | Haze (EBC unit) |
|---|---|---|---|---|---|
| 1 | HCl-treated N-methoxymethyl nylon-6 (Invention) | 89 | 13 | 33 | 0.5 |
| 2 | $H_2SO_4$-treated N-methoxymethyl nylon-6 (Invention) | 92 | 14 | 34 | 0.6 |
| 3 | $H_3PO_4$-treated N-methoxymethyl nylon-6 (Invention) | 88 | 13 | 32 | 0.5 |
| 4 | Nylon-6,6 (Control) | 107 | 24 | 29 | 3.8 |
| 5 | PVPP (Control) | 102 | 20 | 32 | 1.9 |
| 6 | Untreated (Control) | 122 | 27 | 34 | 5.8 |

EXAMPLE 14

20 g of each of the three acid-treated methoxymethyl nylon-6s prepared in Example 13 were dissolved in 300 ml of methanol having 20% of calcium chloride incorporated therein. 1.2 liters of water were gradually added to the solution while being stirred, to form a precipitate in the form of porous flakes. The precipitate was separated by using a quantitative filter paper, washed with water and, then, dried at 75° C for 2 hours in a hot air dryer.

5 g of the dried polymer flakes were placed in 500 ml of fresh beer, which was from the fermenter and cooled to 0° C. The adsorbent-incorporated beer was gently stirred for 5 minutes and, then, filtered by using a quantitative filter paper. 200 ml of the beer filtrate were put into a pasteurized 250 ml bottle and the bottle was provided with a cap. The bottle was allowed to stand at 50° C for 1 week. Then, the haze of the stored beer was determined by using a haze-meter. Results are shown in Table XVII.

EXAMPLE 15

10 g of N-methyl nylon-6,6 having a degree of substitution of 15% were dissolved in 400 ml of ethanol having 30% of lithium chloride incorporated therein. Finely divided silica gel and diatomaceous earth both having a particle size of 100 mesh in average were dispersed in one half and the other half of this solution, respectively. 100 ml of ethanol were added to each dispersion. Then, 600 ml of water were gradually added to each dispersion while being stirred. The solid contained in each dispersion was separated by using a quantitative filter paper, washed with hot water and, then, dried. The two adsorbent materials so prepared contained 9.5% and 9.2% of N-methyl nylon-6,6, based on the weight of silica gel, and diatomaceous earth, respectively.

One g of each of the adsorbent materials was put into 100 ml of fresh beer, having a pH of 4.2, which was from the post-fermenter and cooled to 0° C. The adsorbent-incorporated beer was gently stirred for 5 minutes and, then, filtered by using a quantitative filter paper. Each beer filtrate was tested for its polyphenol and isohumulone contents and pH. Percents of removal of polyphenols and isohumulones and pH are shown in Table XVIII.

For comparison purposes, the aforesaid test for the removal of polyphenols was repeated on an adsorbent material comprised of only finely divided silica gel or diatomaceous earth similar to that used in the above. Results are shown in Table XVIII.

Table XVIII

| Run No. | Adsorbent | % Removal of total polyphenols | % Removal of isohumulone | pH |
|---|---|---|---|---|
| 1 | Silica-gel (Control) | 7.8 | 3.2 | 4.6 |
| 2 | N-methyl nylon-6,6-supported silica-gel (Invention) | 49.5 | 1.7 | 4.3 |
| 3 | Diatomaceous earth (Control) | 6.7 | 2.1 | 4.4 |
| 4 | N-methyl nylon-6,6-supported diatomaceous earth (Invention) | 41.7 | 1.6 | 4.3 |

EXAMPLE 16

5 g of N-methoxymethyl nylon-6 having a degree of substitution of 2.5% were dissolved in 150 ml of ethanol having 30% of calcium chloride incorporated therein. 20 g of finely divided zirconyl hydroxide [ZrO(OH)$_2$] having a particle size of 150 mesh in average was dispersed in the N-methoxymethyl nylon-6 solution. 600 ml of water were gradually added to the dispersion while being stirred. The solid contained in the dispersion was separated by using a quantitative filter paper, washed with water and, then, dried. The adsorbent material so prepared contained 2.36% of N-methoxymethyl nylon-6 based on the weight of zirconyl hydroxide.

Following the procedure set forth in Example 15, the aforesaid adsorbent material was tested for its adsorption capacity for polyphenols and isohumulones present in beer. Percents of removal of total polyphenols and isohumulones and pH of the adsorbent-treated beer are shown in Table XIX. For comparison purposes, the test was repeated on an adsorbent material comprised of only finely divided zirconyl hydroxide similar to that set forth above. Results are shown in Table XIX.

Table XIX

| Run No. | Adsorbent | % Removal of total polyphenols | % Removal of isohumulone | pH |
|---|---|---|---|---|
| 1 | ZrO(OH)$_2$ (Control) | 25.3 | 2.3 | 5.0 |
| 2 | N-methoxymethyl nylon-6-supported ZrO(OH)$_2$ (Invention) | 56.4 | 2.1 | 4.3 |

EXAMPLE 17

20 g of N-substituted nylon-6, having a degree of substitution with —CH$_2$OH of 7.2% and a degree of substitution with —CH$_2$OCH$_3$ of 5.3%, which was similar to that prepared in Example 7, were dissolved in 200 ml of ethanol having 25% of calcium chloride incorporated therein. 500 ml of methanol were added to the solution. Then, 20 g of finely divided active carbon having a particle size of 50 mesh in average were incorporated into the solution. One liter of water was gradually added to the dispersion so prepared, while being stirred. Then, the solid contained in the dispersion was separated by using a quantitative filter paper, repeatedly washed with water and, then, dried. The adsorbent material so prepared contained 98% of the N-substituted nylon-6 based on the weight of active carbon.

Following the procedure set forth in Example 15, the aforesaid adsorbent material was tested for its adsorption capacity for polyphenols and isohumulones present in beer. Percents of removal of total polyphenols and isohumulones and pH of the adsorbent-treated beer are as follows.

| % Removal of total polyphenols | 72.5% |
|---|---|
| % Removal of isohumulones | 18.4 |
| pH | 4.5 |

We claim:

1. A process for removing polyphenols present in vegetable beverages which comprises bringing a vegetable beverage into contact with an adsorbent material in the form of finely divided porous powders or flakes, said adsorbent material consisting essentially of a polyamide containing recurring amide groups as an integral part of the main polymer chain or a mixture of polyamides containing recurring amide groups as an integral part of the main polymer chain in which 0.5% to 65% in number of the hydrogen atoms linked to the nitrogen atoms of the amide linkages in the main chain are substituted with substituents represented by the formula —(CH$_2$)$_n$—R where $n$ is an integer of 1 to 4 and R is at least one member selected from the group consisting of a hydrogen atom, a hydroxyl group and an alkoxy group having 1 to 4 carbon atoms and Rs in the molecule are the same as or different from each other.

2. A process according to claim 1 wherein said vegetable beverage is beer.

3. A process according to claim 1 wherein said vegetable beverage is beer fresh from the fermenter.

4. A process according to claim 1 wherein said vegetable beverage is wine.

5. A process according to claim 1 wherein said contact with the adsorbent material is effected by incorporating the finely divided adsorbent material into the vegetable beverage.

6. A process according to claim 1 wherein said contact with the adsorbent material is effected by passing the vegetable beverage through a filter sheet formed from an aqueous dispersion of said finely divided adsorbent material.

7. A process according to claim 1 wherein said contact with the adsorbent material is effected by passing the vegetable beverage through a bed of said finely divided adsorbent material.

* * * * *